(12) United States Patent
Choi et al.

(10) Patent No.: US 7,572,317 B2
(45) Date of Patent: Aug. 11, 2009

(54) THIOSULFATE GENERATION IN SITU IN PRECIOUS METAL RECOVERY

(75) Inventors: Yeonuk Choi, Oakville (CA); Peter Kondos, Toronto (CA); Mark Graham Aylmore, British Columbia (CA); Jacques McMullen, Oakville (CA); Gus Van Weert, Caledon East (CA)

(73) Assignee: Barrick Gold Corporation, Toronto (CA)

(*) Notice: Subject to any disclaimer, the term of this patent is extended or adjusted under 35 U.S.C. 154(b) by 199 days.

(21) Appl. No.: 11/558,639

(22) Filed: Nov. 10, 2006

(65) Prior Publication Data

US 2007/0137437 A1 Jun. 21, 2007

Related U.S. Application Data

(60) Provisional application No. 60/735,494, filed on Nov. 10, 2005.

(51) Int. Cl.
*C22B 3/04* (2006.01)
*C22B 3/24* (2006.01)
*C22B 3/46* (2006.01)

(52) U.S. Cl. .................. 75/744; 75/734; 75/736
(58) Field of Classification Search .......... 75/744, 75/734, 736; 205/568
See application file for complete search history.

(56) References Cited

U.S. PATENT DOCUMENTS

| 3,728,433 A | 4/1973 | Urban |
|---|---|---|
| 4,070,182 A | 1/1978 | Genik-Sas-Berezowsky et al. |
| 4,269,622 A | 5/1981 | Kerley, Jr. |
| 4,369,061 A | 1/1983 | Kerley, Jr. |
| 4,552,589 A | 11/1985 | Mason et al. |
| 4,654,078 A | 3/1987 | Perez et al. |
| 4,778,519 A | 10/1988 | Pesic |
| 4,902,345 A | 2/1990 | Ball et al. |
| 5,013,359 A | 5/1991 | Fair et al. |
| 5,071,477 A | 12/1991 | Thomas et al. |
| 5,232,491 A | 8/1993 | Corrans et al. |
| 5,354,359 A | 10/1994 | Wan et al. |
| 5,536,297 A | 7/1996 | Marchbank et al. |
| 5,785,736 A * | 7/1998 | Thomas et al. ............... 75/736 |
| 5,876,588 A | 3/1999 | Lalancette et al. |
| 5,902,474 A | 5/1999 | Jones |
| 6,344,068 B1 | 2/2002 | Fleming et al. |

(Continued)

FOREIGN PATENT DOCUMENTS

WO  9111539 A1  8/1991

(Continued)

OTHER PUBLICATIONS

Aylmore M.G. "Treatment of a Refractory Gold-Copper Sulfide Concentrate by Copper Ammoniacal Thiosulfate Leaching", Minerals Engineering, 2001, pp. 615-637, vol. 14, No. 6, Elsevier Science Ltd.
Jiayong et al., "Leaching and Recovery of Gold in Thiosulfate Based System—A Research Summary at ICM", Trans. India Inst. Met., Dec. 1996, pp. 841-849, vol. 49, No. 6.

(Continued)

*Primary Examiner*—George Wyszomierski
*Assistant Examiner*—Tima M McGuthry-Banks
(74) *Attorney, Agent, or Firm*—Senniger Powers LLP

(57) ABSTRACT

Precious metal recovery by thiosulfate leaching where thiosulfate lixiviant is generated in situ employing elemental sulfur generated from partial oxidation of sulfidic precious metal-bearing feed and/or employing reactants from processing effluent.

40 Claims, 2 Drawing Sheets

U.S. PATENT DOCUMENTS

| | | | |
|---|---|---|---|
| 6,428,604 | B1 | 8/2002 | Kerfoot et al. |
| 6,660,059 | B2 | 12/2003 | Ji et al. |
| 2004/0035252 | A1 | 2/2004 | Ji et al. |
| 2004/0115108 | A1* | 6/2004 | Hackl et al. ............... 423/22 |
| 2005/0002852 | A1* | 1/2005 | Karras et al. ............... 423/514 |

FOREIGN PATENT DOCUMENTS

| WO | 2004005556 A1 | 1/2004 |
|---|---|---|

OTHER PUBLICATIONS

Zhang et al., "The Simultaneous Oxidation of Sulfide Minerals and the Dissolution of Gold", Arsenic Metallurgy, Proceedings of a symposium held during the TMS Annual Meeting, San Francisco, Feb. 13-17, 2005, pp. 265-281, R.G. Reddy, V. Ramachandran, eds.

Hemmati, M. et al.; "Study of the Thiosulfate Leaching of Gold from Carbonaceous Ore and the Quantitative Determination of Thiosulfate in the Leached Solutions," University of Nevada, Reno, 1987, 19 pages.

* cited by examiner

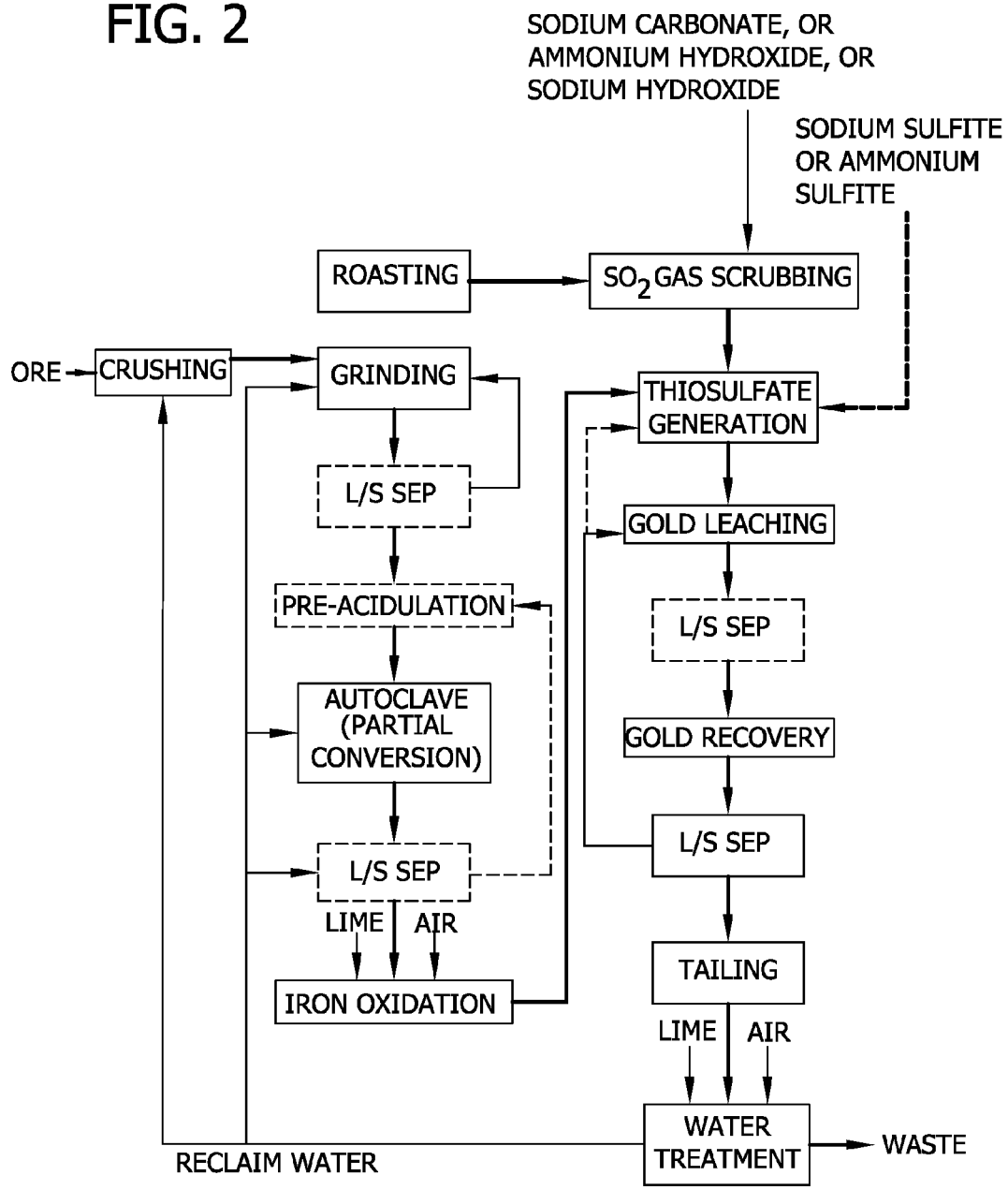

THIOSULFATE GENERATION IN SITU IN PRECIOUS METAL RECOVERY

FIELD OF THE INVENTION

This invention relates to the recovery of gold, silver, and platinum from ores, concentrates, scrap, and other sources by processes employing a thiosulfate-based lixiviant.

BACKGROUND

Gold is typically recovered from ores, concentrates and scraps using conventional cyanidation technology. In the tank leaching process, the slurry pH is adjusted to between 9.5 and 11 with lime, and cyanide is added to solubilize the gold. Air or oxygen is introduced to the slurry by injection or agitation, as applicable. Gold dissolves by the following reaction:

$$4Au + O_2 + 8CN^- + 2H_2O \rightarrow 4Au(CN)_2^- + 4OH^- \tag{1}$$

Gold can be recovered from cyanide solution by adsorption onto activated carbon particles, either during the cyanide leach itself via carbon-in-leach (CIL) or following the leach by carbon-in-pulp (CIP). An alternate method of recovering gold from cyanide leach solutions is through zinc cementation and variations of the Merrill-Crowe process. Aurocyanide can also be recovered from pregnant solutions by ion exchange resins from which gold is eluted with thiourea.

Ball et al., U.S. Pat. No. 4,902,345, disclose treating refractory carbonaceous and sulfidic ores by thiourea leaching in the presence of carbon rather than cyanide leaching.

Marchbank et al., U.S. Pat. No. 5,536,297 discloses recovering gold from refractory carbonaceous ores by pressure oxidation and thiosulfate leaching. Ji et. al, U.S. Pat. No. 6,660,059 discloses an additional method for thiosulfate leaching using sodium thiosulfate.

Thiosulfate leaching of gold is a potentially attractive alternative to the conventional cyanidation process for at least three types of gold ore feed material. First, in gold ores that contain organic carbonaceous material, gold recovery by thiosulfate leaching is usually significantly higher because the gold thiosulfate complex is less sensitive to preg robbing. Secondly, gold/copper ores are frequently not well suited to the cyanidation process owing to higher cyanide consumption by the copper mineralization in the ore. In this case, thiosulfate leaching may be more economical due to the lower reagent consumption, as thiosulfate does not react as readily with copper. Finally, there are certain gold ore bodies that cannot be treated by the conventional cyanidation process due to local environmental restrictions.

The thiosulfate leach process has been proven technically viable, and many aspects of the process are disclosed in publications and patents. For example, Berezowsky et al., U.S. Pat. No. 4,070,182, disclose a process to leach gold from copper-bearing sulfidic material with ammonium thiosulfate, followed by cementation of the gold on zinc dust. Kerley Jr., U.S. Pat. Nos. 4,269,622 and 4,369,061, disclose using an ammonium thiosulfate leach solution containing copper to leach gold and silver from ores containing manganese. Perez et al., U.S. Pat. No. 4,654,078, disclose leaching gold and silver with a copper-ammonium thiosulfate lixiviant to produce a pregnant leach solution, from which gold and silver are recovered by copper cementation. Wan et al., U.S. Pat. No. 5,354,359, disclose leaching gold from preg robbing ores with a thiosulfate lixiviant followed by cementation or precipitation of the leached precious metal values. PCT application WO 91/11539 discloses recovering gold from a gold-loaded thiosulfate solution by adding cyanide to form a gold cyanide complex followed by adsorbing the gold cyanide complex onto a carbon or resin adsorbent. Thomas et al., U.S. Pat. Nos. 5,536,297 and 5,785,736, disclose a process for treating a refractory sulfidic and carbonaceous ore by pressure oxidation followed by thiosulfate leaching and adsorption of the gold thiosulfate complex on an ion exchange resin.

Thiosulfate may be less economically attractive than cyanidation because its leaching kinetics often demand higher reagent concentrations, and because reagent losses occur when thiosulfate is oxidized to polythionates or sulfates. Use of lower reagent strengths (U.S. Pat. No. 5,536,297: Marchbank et al) and regeneration techniques from RIL processes (U.S. Pat. No. 6,660,059: Ji et al) can be employed to reduce the reagent costs associated with thiosulfate leaching.

While thiosulfate on its own is considered environmentally benign, the presence of copper and ammonia in the leach, if ammonium thiosulfate is used, poses some environmental concerns. To mitigate the cost and environmental impact of ammonium thiosulfate leaching it is therefore advisable to regenerate and recycle the reagent. Sodium thiosulfate leaching has been proposed as an alternate; however, sodium thiosulfate is an expensive reagent.

The processes that have been disclosed to extract gold from the thiosulfate leach liquors include cementation on zinc (Berezowsky, et al.) or copper (Perez et al., Wan et al.), conversion of gold thiosulfate to gold cyanide, followed by adsorption on activated carbon (PCT Application WO 91/11539), and adsorption on ion exchange resin (Thomas, et al). Metallurgically these processes are very efficient but are not without limitations. For example, the cementation processes requires separation of the leach solution from the leach solids by filtration or counter-current decantation. Liquid solid separation processes incur high capital expense and gold losses from re-precipitation or entrainment in the leached solids may occur. The process disclosed in PCT Application WO 91/11539 also is also unsuitable for the treatment of carbonaceous preg robbing feed materials without solid/liquid separation prior to final gold recovery.

The process disclosed by Thomas et al., is used to recover gold thiosulfate from solutions or pulp without liquid-solid separation, and efficiently recovers gold from carbonaceous, preg robbing ores. Thiocyanate salts employed for gold elution, however are quite expensive, and thiocyanate losses to the tailings can have a negative impact on process economics and effluent management. In addition, the strong affinity of ion exchange resins for thiocyanate requires the use of sulfuric acid to displace thiocyanate and regenerate the resin. Regeneration with sulfuric acid is effective, but this process increases operating costs and reduces resin life. Strong base ion exchange resins used to recover gold from ammonium thiosulfate solutions also have an affinity for thiosulfate degradation products. Loading of polythionates on the resin will occur because the concentrations of polythionates are significantly higher than that of gold, leading to reduced gold loading, and a decrease in the number of cycles before resin regeneration is required.

Not all ores or other sources of gold are suitable candidates for gold extraction by direct leaching. Many precious metal deposits currently processed throughout the world are sulfidic in nature, and present certain challenges in the extraction and recovery of the contained gold. For example, gold contained in ores as very finely disseminated particles within a sulfide mineral crystal structure or as solid solution may be inaccessible to lixiviants. The cost of size reduction associated with liberating this gold is often prohibitive, and in the case of solid solution, ineffective. This problem has been overcome by oxidizing the sulfides contained in the ore, thereby liberating gold from the sulfide matrix and rendering it amenable to cyanidation. The methods of oxidation employed include bio-oxidation, roasting, atmospheric leaching, alkaline pressure oxidation as in the process disclosed in Mason et al., U.S. Pat. No. 4,552,589, or acidic pressure oxidation as disclosed in Thomas et al. U.S. Pat. No. 5,071,477, the entire disclosures of which are expressly incorporated by reference.

Acid pressure oxidation is typically performed by passing an ore or concentrate slurry through a multi-compartmented autoclave to which an oxygen-containing gas is continuously supplied. Pressure oxidation of sulfidic gold bearing ores is usually performed between 180° C. and 230° C. For certain ores, pre-treatment with sulfuric acid prior to pressure oxidation is required to neutralize the carbonates thereby maintaining acidic conditions in the autoclave and preventing oxygen losses when carbon dioxide is vented.

Some ores are characterized as double refractory because they are both sulfide refractory and preg robbing carbonaceous. In carbonaceous ores, preg robbing occurs when active carbon indigenous to the ore complexes the gold from cyanide leach solutions and reduces recovery. Pressure oxidation can partially deactivate the indigenous carbon, but is often insufficient for highly preg-robbing ores. In some instances, pressure oxidation has been shown to activate carbonaceous matter. An additional problem in recovering gold from highly carbonaceous ores is that a significant quantity of the gold may have been adsorbed onto carbon during formation of the mineral deposit. Cyanide has shown varying degrees of success in leaching gold locked in carbonaceous material, and in some cases, thiosulfate is recognized as a more suitable lixiviant. Several other approaches to reduce the impact of carbonaceous preg robbing have been employed with varying degrees of success. These include the addition of blanking agents such as kerosene or sodium lauryl sulfate or competitive adsorption during the carbon-in-leach process.

SUMMARY OF THE INVENTION

Among the various objects of the invention are the provision of a process for recovering gold from ores in which gold is locked in refractory sulfidic and/or carbonaceous material; a process by which sulfides are partially oxidized and elemental sulfur, and sulfates, as acid and metal sulfates is formed; a process by which elemental sulfur for thiosulfate lixiviant generation if produced by bio-oxidation, atmospheric processes such as chlorination and pressure hydrometallurgical processes; a process in which gold-recovery process-generated elemental sulfur is mixed with a sulfite or bisulfite, and optionally an ammonia/ammonium source, copper, and a weak or strong base ion exchange resin to simultaneously or successively form thiosulfate and extract and recover precious metals; a process employing sulfite ions recovered from scrubbing solutions such as a sulfur dioxide scrubber from roaster off gas, or other sources such as a sulfur burner, gas desulphurization, to react with elemental sulfur and form thiosulfate.

Briefly, therefore, as will be evident from the below detailed discussion, in one significant aspect the invention involves producing elemental sulfur in situ and forming thiosulfate lixiviant in situ in a precious metal recovery operation. This aspect involves forming an aqueous sulfidic precious metal-bearing slurry, subjecting the sulfidic precious metal-bearing slurry to partial oxidation to produce an oxidized precious metal-bearing slurry containing elemental sulfur, neutralizing the oxidized precious metal-bearing slurry containing elemental sulfur, forming thiosulfate compounds in the oxidized precious metal-bearing slurry by reacting the elemental sulfur from the partial oxidation with a reactant which reacts with elemental sulfur to form thiosulfate compounds to yield a precious metal-bearing slurry containing a thiosulfate-based lixiviant, leaching precious metal from the precious metal-bearing slurry to produce a leached slurry comprising a solid residue and precious metal-bearing leachate, and recovering precious metal from the precious metal-bearing leachate.

As will also be evident from the below discussion, in another aspect the invention involves producing thiosulfate lixiviant from elemental sulfur and a reactant from effluent of a precious metal recovery operation. This aspect involves forming an aqueous precious metal-bearing slurry comprising the precious metal-bearing material, forming thiosulfate compounds from a reactant produced from sulfur dioxide effluent from another ore treatment operation, contacting the precious metal-bearing slurry with a lixiviant comprising said thiosulfate compounds to form a precious metal-bearing slurry comprising the lixiviant, leaching precious metal from the precious metal-bearing slurry to produce a leached slurry comprising a solid residue and a precious metal-bearing leachate, and recovering precious metal from the precious metal-bearing leachate. In a preferred embodiment, forming the thiosulfate compounds is performed in the aqueous slurry by introducing the reactant into the slurry to react with elemental sulfur in the slurry.

Other objects and features of the invention will be in part apparent and in part pointed out hereinafter.

BRIEF DESCRIPTION OF THE FIGURES

FIGS. 1 and 2 are schematic depictions of certain aspects of the embodiments described below.

DETAILED DESCRIPTION OF PREFERRED EMBODIMENTS

Figure 1:
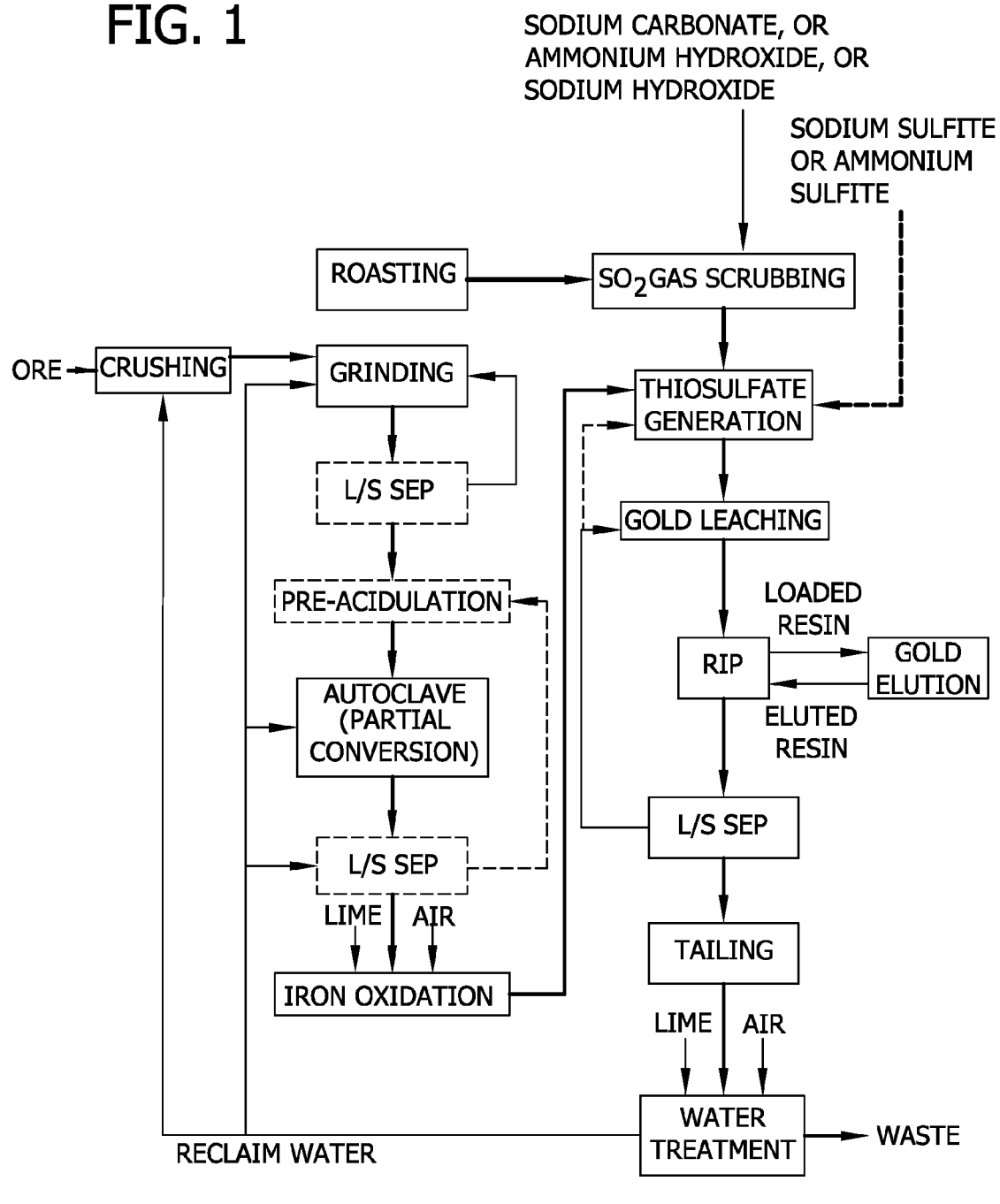

In one embodiment this invention is a process for recovering gold which involves partial oxidation (such as by pressure oxidation) and thiosulfate leaching. One embodiment involves forming an aqueous ore slurry comprising sulfidic and possibly refractory carbonaceous ores or concentrates and subjecting the slurry to pressure oxidation. The pressure oxidation is controlled to partially convert the feed sulfide to elemental sulfur. The operating conditions largely depend on the characteristics of the feed sulfide content and form, and the desired elemental sulfur content in the product residue. Typical conditions to produce a partially oxidized ore slurry include a residence time of about 30 to 180 minutes in an autoclave, a temperature between about 100° C. and 185° C., an oxygen partial pressure of at least 20 psia, and a total pressure of up to about 500 psia such as between about 210 and about 500 psia.

After partial oxidation, the temperature of the partially oxidized autoclave ore slurry is adjusted to between ambient and about 100° C., and its pH is adjusted to between 7 and 11.0, with a suitable alkali. Air sparging may be applied during this step to oxidize and precipitate the ferric iron contained from the pressure leach discharge slurry. The temperature and duration of the iron oxidation is controlled to remove iron from solution. The slurry is then mixed with a sulfite source in an amount required to produce a thiosulfate levels between 1 gpl and 50 gpl, or in an amount required to react with the contained elemental sulfur. If a catalyzing metal is not present in solution, copper may be added in a proportion of up to about 100 ppm such as between about 1 and about 100 ppm together with ammonia to solubilize the copper. Alkali is added to maintain the pH between about 7 and about 11.

The oxidized slurry and formed thiosulfate lixiviant are maintained at a temperature between ambient and about 90° C. while agitating the slurry in a stirred tank reactor system for about 1 to about 24 hours. The recovery of precious metals is achieved by the introduction of a strong base ion exchange resin during the thiosulfate generation and gold leaching steps. Alternatively, recovery of gold may be performed after the gold leaching is completed in the slurry using resin or precipitation techniques; or a liquid-solid separation may be performed and the recovery using resin or precipitation techniques performed on pregnant leachate.

As noted above, the invention in one aspect involves partial oxidation of the feed material. The invention in this aspect benefits from partial conversion of sulfide sulfur which yields elemental sulfur during one of several oxidizing processes. Total conversion of sulfide sulfur to sulfuric acid is exemplified by the reaction of pyrite:

$$4FeS_2 + 15O_2 + 2H_2O \rightarrow 2Fe_2(SO_4)_3 + 2H_2SO_4 \quad (2)$$

$$2Fe_2(SO_4)_3 + 6H_2O \rightarrow 2Fe_2O_3 + 6H_2SO_4 \quad (3)$$

$$4FeS_2 + 15O_2 + 8H_2O \rightarrow 2Fe_2O_3 + 8H_2SO_4 \quad (4)^{(2)+(3)}$$

In partial conversion of pyrite, the reaction is:

$$4FeS_2 + 6O_2 + 2H_2O \rightarrow 2Fe_2O_3 + 6S° + 2H_2SO_4 \quad (5)$$

The concept of partial conversion here should not be confused with incomplete conversion. The percent oxidation for both partial and total oxidation is determined in the same manner; as the percent of the unreacted feed sulfide remaining in the discharged residue. Both reactions 4 and 5 will result in the destruction of sulfide. When total oxidation occurs, all the sulfur is converted to sulfuric acid, and the gold remaining in the residue can be recovered by cyanidation. Under conditions which promote the partial conversion reaction elemental sulfur is formed.

Other sulfides can react to form elemental sulfur under the milder conditions associated with partial conversion.

Pyrrhotite:

$$2FeS + 3/2O_2 \Rightarrow Fe_2O_3 + 2S° \quad (6)$$

Chalcopyrite $$CuFeS_2 + 4Fe(SO_4)_3 \Rightarrow CuSO_4 + 5Fe(SO_4)_2 + 2S° \quad (7)$$

Arsenopyrite $$4FeAsS + 7O_2 + 8H_2SO_4 + 2H_2O \Rightarrow 4H_3AsO_4 + 4Fe^{2+} + 4S \quad (8)$$

Among the materials for which the invention is applicable are ores and concentrates including pyrite, arsenian pyrite, arsenopyrite, marcasite, pyrrhotite, chalcopyrite, marcasite, other pyrite forms, and combinations thereof. The presence of other materials and minerals such as copper sulfides is not excluded.

This invention employs partial conversion of sulfidic ores in a way which can improve overall process economics. A sulfidic precious metal-bearing slurry is subjected to partial oxidation such as by pressure leaching under conditions which promote the formation of elemental sulfur with sufficient sulfide sulfur oxidation to facilitate liberation of precious metal. By operating the autoclave with partial conversion conditions, the amount of oxygen required to oxidize the ore can be reduced. It is evident from reactions 4 and 5 that the partial conversion reaction consumes 60% less oxygen, and produces 75% less acid. Oxidation conditions that promote partial conversion of some or all of the sulfides will therefore result in a decrease in reagent costs for the oxidation and subsequent acid neutralization steps. Partial conversion also has the added benefit of employing lower operating temperatures when compared to total oxidation, and a reduction in temperature may reduce the pressure requirements of the autoclave. This will result in both a savings in capital and operating expenses. A further benefit is that elemental sulfur formed during this or other partial conversion reactions can be combined with a sulfite or bisulfite source to produce thiosulfate. This reaction will produce reagent for subsequent gold leaching and will also remove all or a portion of the elemental sulfur from the leach residue. This removal of elemental sulfur may be useful for subsequent recovery of platinum group metals by conventional cyanidation.

Alternatively, elemental sulfur can be generated from other partial oxidation reactions and metallurgical processes. U.S. Pat. No. 5,232,491, Corrans describes elemental sulfur formation from mild pressure or atmospheric leaching of finely ground sulfidic ore. Elemental sulfur can also be generated from sulfide ores during atmospheric or pressure leaching in chemically enhanced systems such as those employing chloride. Elemental sulfur can be generated by the partial conversion of base metal concentrates and ores as practiced in U.S. Pat. No. 6,428,604 (Kerfoot) and U.S. Pat. No. 5,902,474 (Jones), and can be recovered by flotation as described in the later. U.S. Pat. No. 5,013,359 discloses a process for recovering gold from a refractory sulfidic ore by oxidation with nitric acid, where some portion of the sulfide is oxidized to elemental sulfur. This is an example of what is broadly termed Nitrogen Species Catalyzed Reactions and a reaction that generates elemental sulfur is exemplified below:

$$2MeS + 4NO^+ \Rightarrow 2Me^{2+} + 2S° + 4NO \quad (9)$$

Elemental sulfur can also be formed by reaction of sulfides with chlorine:

$$2FeS_2 + 3Cl_2 \Rightarrow 2FeCl_3 + 2S° \quad (10)$$

In bio-oxidation, a number of intermediate oxidation products of sulfur are generated including elemental sulfur, polymeric sulfur, sulfite, thiosulfate and polythionates, particularly if oxidation is incomplete. Formation of the elemental sulfur intermediate is by the reaction:

$$FeS_2 + Fe^{3+} \Rightarrow 3Fe^{2+} + 2S° \quad (11)$$

Therefore, in the case of bacterial leaching, elemental sulfur remaining in the residue can be reacted with a sulfite source to produce a thiosulfate lixiviant for the recovery of gold.

In the case of a form of sulfide roasting such as that described as thermal activation in U.S. Pat. No. 3,964,901, Swinkels, the following reactions take place in the heating zone:

$$FeS_2 \Rightarrow FeS_{1.05} + 0.95S° \quad (12)$$

While in the combustion zone:

$$S° + O_2 \Rightarrow SO_2 \quad (13)$$

The $SO_2$ produced can be combined with $H_2S$ and be recovered as elemental sulfur using a Claus reactor, and/or can be converted to sulfite by alkali scrubbing. Sulfite and thiosulfate requirements can also be maintained by the reaction in situ of sulfur dioxide and elemental sulfur. As described by Kerley U.S. Pat. No. 4,369,061. It is therefore possible to combine both products of a roasting operation to form the thiosulfate reagents to leach gold:

$$SO_2 + 2NH_4OH \rightarrow (NH_3)_2SO_3 + H_2O \quad (14)$$

$$S° + (NH_3)_2SO_3 \rightarrow (NH_3)_2S_2O_3 \quad (15)$$

This invention therefore provides further opportunities for reducing reagent costs through the in situ generation of thiosulfate ions, using elemental sulfur produced from oxidation products of the sulfide ore with a sulfite source that is either purchased or obtained from an $SO_2$ scrubber solution, as exemplified in reactions (14) and (15).

Accordingly, elemental sulfur from oxidation of the ore itself can be used to react with sodium sulfite and/or sodium bisulfite generated from roaster gas products processed to generate such sodium sulfite and/or sodium bisulfite.

The sulfide materials can be ore, concentrates, scraps or other sources, which may exhibit single or double refractory characteristics, specifically sulfide bearing carbonaceous ores containing precious metals.

Thiosulfate contains ion ($S_2O_3^{2-}$). Ammonium, sodium and calcium thiosulfate are examples.

Sulfite contains ion $SO_3^{2-}$ Ammonium sulfite, and sodium sulfite are examples.

Bisulfite contains the ion $HSO_3^-$

Sulfite/Bisulfite can be purchased or supplied by an $SO_2$ off gas scrubbing solution.

Bisulfite can be converted to sulfite by the addition of a suitable cation, such as $NH_4^+Na^+$, $K^+$.

Elemental sulfur $S^o$ can be generated in one or a combination of processes. Atmospheric leaching, pressure leaching, bio-oxidation, roasting operations, are examples.

References herein to "autoclave" and "compartments" encompass a single, multi-compartmented autoclave as well as an autoclave system comprising multiple, separate, autoclave vessels.

Partial conversion is defined as a process in which elemental sulfur is formed during the oxidation of sulfide components within an ore, or other sulfide bearing feed material.

The present invention provides an improved process for the recovery of gold from refractory sulfidic and carbonaceous ores, including relatively low grade ores. The process is applicable to process whole ore, sulfide concentrate, or a blend thereof. This process can also be used for non-gold bearing sulfide ores, for the purposes of generating thiosulfate.

The process is effective for the recovery of gold from ores which are sulfidic, carbonaceous, and contain iron, arsenic and other heavy metals. The various constituents are oxidized under acidic conditions in a pressure oxidation operation. After the oxidation stage, the sulfuric acid is neutralized and oxides and salts are precipitated in a neutralization operation. The gold is then leached and recovered from the oxidized, neutralized slurry. Preferably, the neutralized slurry is subjected to leaching with thiosulfate generated in situ from the elemental sulfur contained and supplied sulfite.

The specific operations of one preferred embodiment of the invention are now described in further detail.

Partial Conversion

Ground ore slurry in which at least 65-85% by weight, passes 200 mesh, is directed to a trash screen where rock, wood fiber, and/or other foreign material are separated and removed. The ore slurry passing through the screen is directed to a mechanical thickening device, typically a vertical tank of large diameter that provides a net vertical flow low enough to allow sedimentation of the solid particles. In the thickener, the concentration of the ore slurry is increased from a range of about 10-25% by weight to a range of about 40-55%, preferably 45-50%, by weight. To promote separation of solids, a flocculent such as Percol 351 is preferably added to the thickener, at a dosage between 0.02 and 0.1 kg/t of ore and a concentration in the thickener feed of between about 0.05% and about 2% by weight. Overflow from the thickener is recycled to the grinding circuit. If required, thickened ore slurry underflow is directed to a series of stirred acidulation tanks through which the slurry passes continuously. A fresh or recycled sulfuric acid stream is added to the acidulation tanks in order to release carbon dioxide from the carbonate contained in the slurry, and thereby reduce the equivalent carbon dioxide levels in the ore to preferably between 0.1 and 0.7% by weight. To promote removal of $CO_2$, compressed air may be sparged into the acidulation tanks. Depending on the carbonate content of the ore, acidulation with sulfuric acid may be required continuously or sporadically. For other ores, pre-acidulation may be uneconomical.

The pressure oxidation process of the invention preferably operates autogenously, whereby the heat required to sustain the reaction is formed from the exothermic nature of sulfide oxidation. The subjecting the sulfidic precious metal-bearing slurry to partial oxidation in this aspect comprises subjecting the sulfidic precious metal-bearing slurry to pressure leaching under conditions facilitating formation of elemental sulfur with sufficient sulfide sulfur oxidation to facilitate liberation of precious metal from the precious metal-bearing material. The ore used as feed to the process preferably contains at least about 1% by weight sulfur in the form of sulfides, and may contain up to 25%, in the case of concentrates. All percentages herein are by weight. The addition of steam, or cooling water may be required depending upon the sulfide composition of the feed. As a further alternative, pyrite concentrates may be blended with the ore feed to provide an additional source of sulfide sulfur and assure sufficient autogenous heating. Low or high sulfide feeds may also be blended to optimize the elemental sulfur level in the residue. As a general proposition, the oxidized precious metal-bearing slurry produced by the partial oxidation comprises a solid residue having between about 0.05 and about 15% elemental sulfur by weight. A further option is to supplement the elemental sulfur formed in the slurry with an external source of sulfur.

Although the ore may be processed in the autoclave on a batch or a continuous basis, continuous treatment is preferred. A single, multi-compartmented autoclave is preferred but multiple separate autoclave vessels may be used. In the autoclave, the slurry is passed through a plurality of compartments to provide a retention time between 30 and 180 minutes, where it is contacted in the presence of sulfuric acid with oxygen gas at a temperature of between about 100° C. and about 185° C., an oxygen partial pressure of at least about 20 psia and a total pressure of between about 100 and about 500 psia is maintained. Sulfuric acid levels entering the autoclave can vary between 0 gpl to 150 gpl. The source of the acid may be through the addition of fresh acid, or from acid produced during the oxidation of the sulfide ore or a combination thereof. High acid levels are sometimes required to promote rapid oxidation of sulfide sulfur in the ore and achieve maximum release of the gold entrapped in the sulfide. However the process may be completed without the additional of sulfuric acid.

Optional ferric ions can be introduced to the autoclave to promote oxidation of the sulfide, either added as fresh reagent or through the recycling of some or all of the autoclave solution discharge. Accordingly, in order to reduce the oxygen demand, energy requirements for maintaining the reaction temperature, and the reduced formation of free acid and associated reduction in neutralization costs, it is preferable to oxidize a portion of the sulfidic sulfur to the elemental sulfur state rather than completely convert the contained sulfide to sulfate. The decrease in oxygen overpressure and operating temperature results in reduced capital expenditure, as total pressure the autoclave must withstand is less structurally demanding.

The addition of a dispersing agent, such as a lignosulfonate may be added at a dose of 0 to 5 kg/t elemental sulfur.

The final acidity of the slurry leaving the last compartment of the autoclave may range from 2 to 150 gpl of solution, is preferably less than about 25 gpl, more preferably less than about 10 gpl, and most preferably between about 5 and 10 gpl. If economically applicable, acid recycle from the autoclave discharge to autoclave feed may be employed. By reducing the amount of excess sulfuric acid in the oxidized slurry, there is not only a reduction in the amount of lime used and the quantity of salts generated, but also, the equipment ancillary to the autoclave can be manufactured from less costly materials of construction. For example, items of equipment, piping, valves and the like can be constructed of lower grade alloys instead of more expensive acid-resistant materials, as has been the prior practice.

In practice, the amount of sulfide sulfur, which must be oxidized sulfate and elemental sulfur and to liberate the gold, depends on the nature of the sulfides present and the nature of the gold characteristics in the various sulfides. Typically, oxidation of 50% to over 95% of the sulfide sulfur is required. In the present invention, preferably between about 2 and about 35% by weight of sulfide in the ore or concentrate is converted to elemental sulfur by the partial oxidation. The amount of elemental sulfur formed during oxidation is controlled by the operating temperature, the amount of oxygen available to react with sulfide, pressure, acid level, chloride level. (See Example 1)

The elemental sulfur level contained in the residue is preferably controlled to produce the required amount of thiosulfate, in the pulp, at a particular pulp density, and to produce a concentration of thiosulfate in solution from 2 to 50 gpl.

The autoclave discharge having a solids content of at least about 30% by weight, preferably at least about 35% to 50% by weight, and containing soluble sulfates, and iron salts, is transferred to an intermediate vessel.

In this invention cost savings are realized by operating the pressure oxidation circuit under partial conversion conditions, thereby lowering energy and oxygen consumption, as well as reagent consumption required during acid neutralization. Partial conversion produces 75% less acid than total conversion.

Thiosulfate Generation and Gold Extraction

In this invention, precious metal recovery is achieved by thiosulfate leaching rather than by cyanidation to achieve a number of objectives, one of which is to avoid cyanidation in an environment of which promotes thiocyanate formation and high cyanide consumption.

Thiosulfate compounds are produced from elemental sulfur and a reactant from effluent of a precious metal recovery operation. In a preferred embodiment, forming the thiosulfate compounds is performed in situ an aqueous slurry to be leached by introducing the reactant into the slurry to react with elemental sulfur in the slurry. As a general proposition, it is preferred that the reactant which reacts with elemental sulfur to form thiosulfate compounds is provided in the form of sodium sulfite, sodium bisulfite, ammonium sulfite, ammonium bisulfite, calcium sulfite, calcium bisulfite, sulfurous acid, and combinations thereof.

Following partial pressure oxidation, the oxidized slurry is partially cooled to between ambient and 90° C. and is neutralized. Although an intermediate washing and/or liquids-solids separation step may be employed, direct neutralization after cooling is preferred to minimize capital costs. Independent of the elemental sulfur source, lime and/or other alkali is added to increase the pH to between about 7 and about 11, such as to between about 7 and about 8.7, more preferably to about 8.0, prior to leaching. Lime is highly preferred but the neutralization may be carried out with other bases capable of forming sulfate salts and raising the pH to a level at which iron and arsenate salts precipitate. Compressed air is optionally sparged into the slurry in the neutralization tanks to convert ferrous iron to ferric iron. The neutralized slurry, having a solids content of 30-40% by weight and a temperature of about ambient to 90° C. is directed to the thiosulfate leach operation. Optionally, the pulp density of the neutralized slurry can be adjusted with a barren thiosulfate solution, as a means of recycling the lixiviant.

The slurry flowing through the thiosulfate generation, gold leaching and gold recovery tanks is between about 20 and 45% solids, preferably about 40% solids. It is preferred that thiosulfate generation, leaching, and gold recovery by RIL is performed simultaneously in a stirred tank reactor system on a batch or continuous basis. In continuous mode, the stirred tank reactor system preferably comprises from two to eight mechanically agitated tanks, preferably six, arranged in series. The residence time at each stage is between about 30 and 120 minutes, preferably about 60 minutes. A temperature of between about ambient and 90° C., preferably between about 50° C. and 70° C., is maintained throughout leaching to promote rapid dissolution of gold to form the soluble $Au(S_2O_3)_2^{3-}$ complex.

The leaching of gold is accomplished by oxidation of metallic gold and complexing with thiosulfate to form the $Au(S_2O_3)_2^{3-}$ complex according to the following reaction:

$$4Au+8S_2O_3^{2-}+O_2+H_2O \rightarrow 4Au(S_2O_3)_2^{3-}+4OH^-$$

Ammonium sulfite is added to react with the elemental sulfur and form thiosulfate. Alternative embodiments employ other soluble sulfite salts, such as sodium sulfite or sodium bisulfite. The amount of sulfite added is dependent on the amount of elemental sulfur contained within the autoclave residue and the amount of thiosulfate recovered and recycled after gold recovery processes have been completed. Preferably, the reactant which reacts with elemental sulfur to form thiosulfate compounds is supplied in a concentration sufficient to react with substantially all of the elemental sulfur produced by the partial oxidation. In another preferred aspect, the reactant is introduced into the slurry in a concentration sufficient to generate enough thiosulfate to leach at least about 80% of gold from the slurry. Another factor in determining the amount of sulfite addition is the maintenance of 0.001M to about 1M, such as between 0.001 and about 0.01M and preferably 0.01 to 0.05M sulfite in solution, which has been found to prevent the re-precipitation of gold as its sulfide. An excess of sulfite ions is therefore required to maintain high gold recoveries. A further advantage of this invention is that the residue after thiosulfate formation is substantially free of elemental sulfur. A further option is to supplement the thiosulfate formed in the slurry with an external source of thiosulfate.

In addition to sulfite, cupric ions may be added to the leach tanks to maintain a level of 20 to 100 ppm to catalyze the gold-thiosulfate reaction. The cupric ion may require the addition of ammonia to maintain its solubility. The cupric ion can also be maintained in solution by the ammonium ions associated with ammonium sulfite or ammonium thiosulfate, or ammonia can be added if other sources of sulfite are used. The cupric ion may not be required if other metals capable of catalyzing the reaction are present in solution, and this is a function of feed ore/concentrate composition.

In order to minimize the loss of ammonia, and minimize the precipitation of gold and copper associated with those losses, the pH of the thiosulfate generation, gold leaching, and RIL recovery operation is maintained in the range of 7 to 11 and most preferably 8.0.

In the preferred embodiment of the invention, gold is recovered from the slurry using a strong base ion exchange resin, for example Purolite A-500. The ion exchange resin is added to the slurry during thiosulfate generation and gold leaching. A further option for gold recovery in accordance with this invention is to separate the gold-bearing leachate from the solid residue and contact the gold-bearing leachate with an adsorbent, such as an ion exchange resin or a solvent extraction reagent, having an affinity for the gold-thiosulfate complex.

The slurry containing the gold-bearing lixiviant solution and solid residue are then fed to a gold recovery operation. In an alternate process the slurry leaving the thiosulfate leaching operation is subjected to a countercurrent decantation (CCD) wash circuit and the solids portion is removed as tailings. Gold is recovered by zinc, copper, aluminum or iron cementation, or by precipitation with sodium sulfide.

If the elemental sulfur free tailings contain PGMs they may be subjected cyanidation or other recovery method.

Alternate Sources of Elemental Sulfur

Elemental sulfur can be generated from sulfidic ore in various ways. Elemental sulfur generation can be achieved in atmospheric pressure leaching by fine grinding of the sulfidic ore. Elemental sulfur can also be generated from sulfide ores during atmospheric or pressure leaching in chemically enhanced systems such as those employing chloride or nitrogen species. Elemental sulfur can be generated during bio-oxidation of the sulfidic ore, or by selective roasting of sulfidic ore.

Employment of Sulfite Generated in Scrubbing Solutions

In one embodiment of this invention, a sulfite and/or bisulfite source can be recycled from a gas stream of acceptable composition, such as from a roasting facility. Sulfite and/or bi-sulfite compounds are recovered from, for example, a scrubbing solution from roaster off-gas treatment, or as a separately required additive if a roasting plant is not available. This sulfite and/or bisulfite is added to the process stream after partial conversion, where they will come in contact with the elemental sulfur formed during partial conversion, to generate, in situ, a thiosulfate leaching agent.

As an alternative to roaster gases, the invention employs off-gas from another pyrometallurgical unit operation such as a coal-fired plant, smelter, or other operation which yields sulfur-containing off-gas.

Accordingly, one aspect of this invention is that thiosulfate is generated using roasting scrubber waste solution. In one embodiment, sulfite or bisulfate ions recovered from scrubbing solutions can be used as the sulfite source. In particular, the off-gas is from a sulfide mineral roaster which contains sulfur dioxide gas, and is scrubbed using sodium carbonate or sodium hydroxide or ammonium hydroxide as in the following reactions:

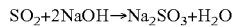

$SO_2 + 2NaOH \rightarrow Na_2SO_3 + H_2O$

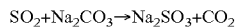

$SO_2 + Na_2CO_3 \rightarrow Na_2SO_3 + CO_2$

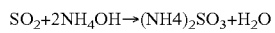

$SO_2 + 2NH_4OH \rightarrow (NH4)_2SO_3 + H_2O$

As a further alternative, during or right after pressure oxidation or other pre-oxidation operation such as bio-oxidation or roasting, one can add a sulfite compound such as sodium sulfite obtained from sources other than roaster gas recovery streams. This added sulfite reacts with elemental sulfur generated from ore processing and produces the thiosulfate ion. This thiosulfate is therefore generated in situ, and is available for leaching and complexing with precious metals (e.g., gold).

Alternatively, ammonia can be used as scrubbing solution of roaster or other $SO_2$-containing gases to generate ammonium sulfite. This ammonium sulfite can be reacted with elemental sulfur either added as a chemical or as a by-product of a sulfide oxidation reaction as previously described to produce ammonium thiosulfate. It is produced in situ and is available for leaching and complexing with precious metals. In the example where the cation is ammonium:

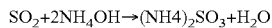

$SO_2 + 2NH_4OH \rightarrow (NH4)_2SO_3 + H_2O$

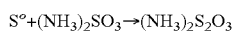

$S° + (NH_3)_2SO_3 \rightarrow (NH_3)_2S_2O_3$

FIGS. 1 and 2 depict flowsheets illustrating how the invention is performed in certain preferred embodiments. In each figure thiosulfate is generated in situ using indigenous sulfur and process stream $SO_2$ as described above. The distinctions between the figures lie in the methods of gold recovery from the leached slurry—by resin-in-pulp, or by other means. More particularly, in the embodiments depicted, the feed material is pyritic ore which is subjected to crushing, grinding, and optionally other traditional mineral dressing. Pulping at the crushing and grinding operations employs reclaim water as shown. After grinding, there is an optional liquids/solids separation operation, followed by optional pre-acidulation, i.e., acidulation before the autoclave. Acid recycle from an optional liquids/solids separation after the autoclave may optionally be used here. Partial oxidation or partial conversion is performed in the autoclave to generate the oxidized slurry containing elemental sulfur as described above. Iron oxidation is performed to precipitate ferric iron. Thiosulfate generation is then performed in the slurry by the introduction of reactants to react with the elemental sulfur in the slurry generated by the partial oxidation. One preferred source of reactants is sodium and ammonium sulfites and bisulfites created in a roaster gas scrubbing operation as shown. A further option (not shown) is to supplement the thiosulfate formed in the slurry with an external source of thiosulfate. This may optionally be supplemented or replaced by another source of reactants such as sodium or ammonium sulfite. Thiosulfate is generated in the slurry, and gold is leached. Though two boxes are shown to depict these distinct operations, they occur simultaneously in the same vessel. In the option shown in FIG. 1, resin-in-pulp (RIP) extraction is performed on the slurry, preferably simultaneously and in the same vessel (e.g., stirred-tank reactor, batch or continuous) as the thiosulfate generation and gold leaching. The resin is separated out and gold eluted conventionally. The treatment of the solids residue and barren leachate are conventional, as shown here with a liquids-solids separation step, tailings treatment, etc. In the alternative shown in FIG. 2, the simultaneous thiosulfate generation and gold leaching are followed by an optional liquids-solids separation step. The pregnant leachate therefrom is subjected to gold recovery. These figures depict certain significant aspects of certain preferred embodiments, and are not intended to depict all variations of the invention.

The invention is further illustrated by the following working examples.

EXAMPLE 1

Partial Conversion of Sulfide with Varying Feed Sulfide Contents and Operating Conditions A series of gold-bearing materials with various pyrite concentrations were treated in a batch autoclave at a feed pulp density of 40% and under the conditions in the table below.

| Feed Sulfide % | Retention Time (minutes) | Temperature °C. | H₂SO₄ gpl | Ferric Iron gpl | O₂ over-pressure psi | % sulfide converted to elemental sulfur | Total % Sulfide conversion |
|---|---|---|---|---|---|---|---|
| 2.07 | 120 | 125 | 75 | 10.25 | 55 | 22.4 | 90 |
| 2.07 | 120 | 140 | 25 | 20 | 70 | 22.4 | 97 |
| 2.07 | 120 | 140 | 25 | 0.5 | 70 | 12.8 | 93 |
| 2.07 | 60 | 170 | 10 | 0 | 100 | 3 | 96 |
| 2.07 | 60 | 150 | 10 | 0 | 100 | 20 | 96 |
| 2.07 | 60 | 150 | 0 | 0 | 100 | 16 | 90 |
| 8.05 | 60 | 150 | 0 | 0 | 100 | 15 | 72 |
| 8.05 | 120 | 150 | 0 | 0 | 100 | 16 | 87 |
| 21.1 | 120 | 150 | 0 | 0 | 100 | | |
| 21.1 | 120 | 170 | 0 | 0 | 100 | 1 | 91 |

This example demonstrates that the percent conversion of sulfide to elemental sulfur during the partial conversion process can be controlled. Generally, an increase in temperature and residence time reduces the percent of the sulfide converted to elemental sulfur. With feed materials containing high levels of sulfide, a lower percentage of sulfide conversion to elemental sulfur is required in order to produce the thiosulfate in the desired range to leach at least about 80% of gold from the slurry, e.g., in a range of about 2-50 gpl for one particular embodiment. This example also illustrates that the process can successfully produce elemental sulfur in a wide range of acid levels and ferric iron levels.

EXAMPLE 2

Thiosulfate Generation: Feed with High Sulfur Levels

A gold bearing concentrate was partially oxidized at in a batch autoclave at a feed pulp density of 40%, and at 150° C. and 100 psi, for a period of two hours, to produce a material containing a concentration of 3.74% elemental sulfur.

| Feed Concentrate | |
|---|---|
| Gold | 36.4 g/t |
| Silver | 17.5 g/t |
| Carbon | 0.18% |
| Organic Carbon | 0.01% |
| Sulfur | 21.1% |
| Arsenic | 2.3% |
| Copper | 0.17% |

The partial conversion residue was then used for in situ ammonium thiosulfate generation. The portion of the residue was re-pulped with water to a density of 23% and the pH was adjusted, and maintained above 9 with sodium hydroxide. The slurry was heated to 70° C. with gentle agitation and ammonium sulfite was added to the pulp at a level of 0.6 times the stoichiometric amount of elemental sulfur contained in the residue. After 1 hour the level of thiosulfate measured in solution was 8.7 gpl and after 2 hours it was 9.3 gpl.

EXAMPLE 3

Feed with Preg Robbing Organic Carbon and Low Sulfur Levels

Thiosulfate generation was also accomplished using partially oxidized autoclave discharge with a substantially lower concentration of elemental sulfur than shown in Example 2. This ore also contains a preg robbing organic carbon component. The gold in the ore is distributed as finely disseminated particles contained within the sulfidic minerals. For this reason, the ore is also characterized as refractory.

The mineralogy consists of quartz with calcite and dolomite as the carbonate source. There are minor amounts of pyrite, gypsum and kaolinite, and trace amounts of iron containing minerals such as hematite, magnetite, arsenopyrite, chalcopyrite and pyrrhotite.

The low carbonate levels in the feed permits the processing of the ore in the autoclave without a pre-acidulation step:

| | |
|---|---|
| Gold | 4.04 g/t |
| Sulfur | 2.51% |
| Sulfide | 2.07% |
| Iron | 2.4% |
| Carbonate | 0.85% |
| Organic Carbon | 0.28% |

The partial conversion autoclave product containing 0.30% elemental sulfur was re-pulped with water to a density of 23% and heated to 70° C. with gentle agitation. The pH was adjusted and maintained above 8 throughout the thiosulfate generation and leaching process with lime. Ammonium sulfite was added to the pulp mixture at 4.3 times the stoichiometric amount of elemental sulfur in the residue. Twenty ppm of copper was added to catalyze the gold leaching reaction. A strong base ion exchange resin was added to extract gold thiosulfate from solution. The thiosulfate level in solution after 1 hour was 5.2 g/L indicating that all the elemental sulfur in the residue reacted to form thiosulfate. After four hours gold recovery by Resin in Leach was 83.4%.

EXAMPLE 4

The same ore as used in example 3 was processed using partial conversion. The autoclave discharge slurry was treated for ferrous iron removal. Unlike example 2, no liquid solid separation occurred between pressure oxidation and thiosulfate generation.

A partially oxidized autoclave product was produced in a batch process by treating the ore for one hour, at an oxygen over pressure of 100 psi, and a temperature of 150° C., with the addition of 10 gpl acid. Total sulfide oxidation was 96% and the residue contained 0.5% elemental sulfur. The solution portion of the discharge slurry contained 3.3 g/L iron, and 0.8 g/L ferrous iron, and 11 g/L free acid.

The slurry was neutralized with lime to a terminal pH of 4 with air sparging at a temperature between 70° C. and 80° C., to reduce the total and ferrous iron content to 19 ppm in the solution phase.

The pH of the slurry was adjusted to 8 with lime, and a cationic surfactant was added at a dose of 1 kg/t. Ammonium sulfite was added at a concentration of 0.125 M, in the presence of 50 ppm copper. The pH was maintained at 8 with lime. After 4 hours of leaching the level of thiosulfate in solution was 4.2 g/L thiosulfate, indicating that at least 88% of the elemental sulfur in the residue was converted to thiosulfate. Gold extraction from RIL after 4 hours was 82.6%. Gold extraction increased to 84.8% after twenty four hours.

EXAMPLE 5

The same ore as employed in Example 3 was processed using partial conversion. Thiosulfate generation was performed using sodium sulfite on a filtered autoclave discharge slurry, and gold was recovered by RIL.

A partially oxidized autoclave product was produced in a batch process by treating the ore for one hour, at an oxygen over pressure of 100 psi, and a temperature of 140° C., with the addition of 10 gpl acid. Total sulfide oxidation was 90% and the residue contained 0.38% elemental sulfur.

The slurry was filtered and repulped in water to 40% solids and neutralized with hydrated lime to a pH of 8, and heated to 70° C. Sodium sulfite was added at a concentration of 0.1 M, followed by a strong base ion exchange resin. No copper was added. The pH was maintained at 8 with lime. After 4 hours of leaching the level of thiosulfate in solution was 7.39 g/L thiosulfate, indicating that at least 99% of the elemental sulfur in the residue was converted to thiosulfate. Gold extraction from RIL after 4 hours was 81%, based on head and residue assays.

In view of the above, it will be seen that the several objects of the invention are achieved and other advantageous results attained.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A process for recovering precious metal from a sulfidic precious metal-bearing material comprising the steps of:
    forming an aqueous sulfidic precious metal-bearing slurry comprising the sulfidic precious metal-bearing material;
    subjecting the sulfidic precious metal-bearing slurry to partial oxidation by pressure oxidation to produce an oxidized precious metal-bearing slurry containing elemental sulfur to form a pressure oxidation discharge oxidized precious metal-bearing slurry;
    neutralizing the pressure oxidation discharge oxidized precious metal-bearing slurry containing elemental sulfur;
    forming thiosulfate compounds in situ in the pressure oxidation discharge oxidized precious metal-bearing slurry by reacting the elemental sulfur from the partial oxidation with a reactant which reacts with elemental sulfur to form thiosulfate compounds to yield a pressure oxidation discharge oxidized precious metal-bearing slurry containing a thiosulfate-based lixiviant;
    leaching precious metal from the pressure oxidation discharge oxidized precious metal-bearing slurry with the thiosulfate generated in situ with said pressure oxidation discharge oxidized precious metal-bearing slurry to produce a leached slurry comprising a solid residue and precious metal-bearing leachate; and
    recovering precious metal from the precious metal-bearing leachate.

2. The process of claim 1 wherein the sulfidic precious metal-bearing material comprises iron sulfide in a form selected from among pyrite, arsenian pyrite, arsenopyrite, marcasite, chalcopyrite, other pyrite forms, and combinations thereof.

3. The process of claim 1 wherein the sulfidic precious metal-bearing material is pyritic.

4. The process of claim 3 wherein the sulfidic precious metal-bearing material is in the form of an ore or concentrate and comprises one or more minerals selected from the group consisting of pyrite, arsenian pyrite, arsenopyrite, chalcopyrite, pyrrhotite, and mixtures thereof.

5. The process of claim 1 wherein the subjecting the sulfidic precious metal-bearing slurry to partial oxidation comprises subjecting the sulfidic precious metal-bearing slurry to pressure leaching under conditions facilitating formation of elemental sulfur with sufficient sulfide sulfur oxidation to facilitate liberation of precious metal from the precious metal-bearing material.

6. The process of claim 5 wherein the pressure leaching is performed in an autoclave for a residence time between about 30 and about 180 minutes at a temperature between about 100° C. and about 185° C.

7. The process of claim 6 wherein the pressure leaching is performed at an oxygen partial pressure of at least 20 psia and a total pressure up to about 500 psia.

8. The process of claim 1 wherein the subjecting the sulfidic precious metal-bearing material to partial oxidation comprises subjecting the sulfidic precious metal-bearing material to atmospheric leaching to produce the oxidized precious metal-bearing slurry containing elemental sulfur.

9. The process of claim 1 wherein the subjecting the sulfidic precious metal-bearing material to partial oxidation comprises subjecting the sulfidic precious metal-bearing material to thermal activation to produce the oxidized precious metal-bearing slurry containing elemental sulfur.

10. The process of claim 1 wherein the subjecting the sulfidic precious metal-bearing material to partial oxidation comprises subjecting the sulfidic precious metal-bearing material to bio-oxidation to produce the oxidized precious metal-bearing slurry containing elemental sulfur.

11. The process of claim 1 further comprising adding thiosulfate compounds to the slurry in addition to said forming thiosulfate compounds in the slurry.

12. The process of claim 1 wherein the reactant which reacts with elemental sulfur to form thiosulfate compounds is selected from the group consisting of sulfite, bisulfite, compounds thereof, and combinations thereof.

13. The process of claim 1 wherein the reactant which reacts with elemental sulfur to form thiosulfate compounds is provided in the form of sodium sulfite, sodium bisulfite, ammonium sulfite, ammonium bisulfite, calcium sulfite, calcium bisulfite, sulfurous acid, and combinations thereof.

14. The process of claim 12 wherein the reactant is supplied from a sulfur dioxide gas scrubbing operation.

15. The process of claim 1 wherein the neutralizing comprises neutralizing the oxidized slurry to a pH between about 7 and about 11.

16. The process of claim 1 wherein the recovering precious metal from the precious metal-bearing leachate comprises adsorption of gold-thiosulfate onto an ion exchange resin.

17. The process of claim 1 wherein the recovering precious metal from the precious metal-bearing leachate comprises adsorption of gold-thiosulfate onto an ion exchange resin, and said adsorption is performed simultaneously and in a common vessel with the operations of forming thiosulfate compounds and leaching.

18. The process of claim 1 wherein the recovering precious metal from the precious metal-bearing leachate comprises adsorption of gold-thiosulfate onto an ion exchange resin, and said adsorption is performed simultaneously and in a common stirred tank reactor with the operations of forming thiosulfate compounds and leaching.

19. The process of claim 1 wherein the recovering precious metal from the precious metal-bearing leachate comprises adsorption of gold-thiosulfate onto an ion exchange resin, and said adsorption is performed simultaneously and in a common stirred tank reactor with the operations of forming thiosulfate compounds and leaching, wherein the stirred tank reactor has between about two and about eight mechanically agitated tanks with a residence time in each tank between about 30 and about 120 minutes at a temperature below about 110° C.

20. The process of claim 1 wherein the steps of forming thiosulfate compounds and leaching are performed simultaneously on a batch basis in a stirred-tank reactor.

21. The process of claim 1 wherein the steps of forming thiosulfate compounds and leaching are performed simultaneously on a continuous basis in a stirred-tank reactor.

22. The process of claim 1 wherein the sulfidic precious metal-bearing material is pyritic ore or concentrate and between about 2 and about 35% by weight of sulfide in the ore or concentrate is converted to elemental sulfur by said partial oxidation.

23. The process of claim 1 wherein the oxidized precious metal-bearing slurry produced by the partial oxidation comprises a solid residue having between about 0.05 and about 15% elemental sulfur by weight.

24. The process of claim 1 wherein the reactant which reacts with elemental sulfur to form thiosulfate compounds is supplied in a concentration sufficient to react with substantially all of the elemental sulfur produced by the partial oxidation.

25. The process of claim 1 wherein the precious metal is gold and the reactant is introduced into the slurry in a concentration sufficient to generate enough thiosulfate to leach at least about 80% of gold from the slurry.

26. The process of claim 1 wherein the precious metal is gold and recovering precious metal from the precious metal-bearing leachate comprises conversion of gold thiosulfate to gold cyanide followed by adsorption onto activated carbon.

27. The process of claim 1 wherein the precious metal is gold and recovering precious metal from the precious metal-bearing leachate comprises conversion of gold thiosulfate to gold cyanide followed by adsorption onto ion exchange resin.

28. The process of claim 1 further comprising performing a liquids-solids separation to separate the precious metal-bearing leachate from the oxidized residue prior to recovering precious metal from the precious metal-bearing leachate.

29. The process of claim 28 wherein the precious metal is gold and recovering precious metal from the precious metal-bearing leachate comprises cementation.

30. The process of claim 29 wherein said cementation comprises a process selected from among zinc cementation, iron cementation, aluminum cementation, and copper cementation.

31. The process of claim 29 the precious metal is gold and recovering precious metal from the precious metal-bearing leachate comprises adsorption onto activated carbon or ion exchange resin.

32. A process for recovering precious metal from a precious metal-bearing material comprising the steps of:
forming an aqueous precious metal-bearing slurry comprising the precious metal-bearing material;
subjecting the sulfidic precious metal-bearing slurry to partial oxidation by pressure oxidation to produce an oxidized precious metal-bearing slurry containing elemental sulfur to form a pressure oxidation discharge oxidized precious metal-bearing slurry;
forming thiosulfate compounds in situ in the pressure oxidation discharge oxidized precious metal-bearing slurry from said elemental sulfur and a reactant produced from sulfur dioxide effluent from another ore treatment operation;
contacting the oxidized precious metal-bearing slurry with a lixiviant comprising said thiosulfate compounds to form a precious metal-bearing slurry comprising the lixiviant;
leaching precious metal from the oxidized precious metal-bearing slurry to produce a leached slurry comprising a solid residue and a precious metal-bearing leachate; and
recovering precious metal from the precious metal-bearing leachate.

33. The process of claim 32 wherein the precious metal-bearing material comprises a sulfidic gold-bearing ore or concentrate and the aqueous precious metal-bearing slurry is a gold-bearing slurry, and forming the thiosulfate compounds is performed in the aqueous gold-bearing slurry by introduction of said reactant into the slurry to react with elemental sulfur in the slurry.

34. The process of claim 33 comprising adding thiosulfate compounds to the slurry in addition to said forming the thiosulfate compounds in the slurry.

35. The process of claim 33 wherein the reactant is introduced in a concentration sufficient to consume substantially all elemental sulfur in the slurry in forming thiosulfate compounds.

36. The process of claim 33 wherein the reactant is introduced into the slurry in a concentration sufficient to generate enough thiosulfate to leach at least about 80% of gold from the slurry.

37. The process of claim 33 wherein said sulfur dioxide effluent is from treatment of said sulfidic gold-bearing ore or concentrate.

38. The process of claim 33 wherein the reactant which reacts with elemental sulfur to form thiosulfate compounds is selected from the group consisting of sulfite, bisulfite, compounds thereof, and combinations thereof.

39. The process of claim 33 wherein the reactant which reacts with elemental sulfur to form thiosulfate compounds is provided in the form of sodium sulfite, sodium bisulfite, ammonium sulfite, ammonium bisulfite, calcium sulfite, calcium bisulfite, sulfurous acid, and combinations thereof.

40. A process for recovering gold from a pyritic ore comprising the steps of:
forming an aqueous pyritic ore slurry comprising the pyritic ore;
subjecting the pyritic ore slurry to partial oxidation by pressure oxidation in an autoclave for a residence time between about 30 and about 180 minutes at a temperature between about 100° C. and about 185° C. whereby between about 2 and about 35% of sulfide in the ore is converted to elemental sulfur to yield a pressure oxidation discharge oxidized gold-bearing slurry containing elemental sulfur;

neutralizing the oxidized gold-bearing slurry containing elemental sulfur;

forming thiosulfate compounds in situ in the pressure oxidation discharge oxidized gold-bearing slurry by reacting the elemental sulfur from the partial oxidation with a reactant which reacts with elemental sulfur to form thiosulfate compounds to yield a pressure oxidation discharge gold-bearing slurry containing a thiosulfate-based lixiviant, wherein the reactant is provided in the form of sodium sulfite, sodium bisulfite, ammonium sulfite, ammonium bisulfite, calcium sulfite, calcium bisulfite, sulfurous acid, and combinations thereof;

leaching gold from the pressure oxidation discharge gold-bearing slurry containing the thiosulfate-based lixiviant with the thiosulfate-based lixiviant generated in situ in the pressure oxidation discharge oxidized gold-bearing slurry to produce a leached slurry comprising a solid residue and gold-bearing leachate; and recovering gold from the gold-bearing leachate.

\* \* \* \* \*